United States Patent

Katai et al.

[11] Patent Number: 5,935,654
[45] Date of Patent: Aug. 10, 1999

[54] EXTRUSION COATING METHOD AND COATING APPARATUS WITH SWIRL AND THROTTLE MEANS

[75] Inventors: Kazuo Katai; Naomi Yoshiike; Yutaka Shimizu; Hideki Tanaka, all of Nagano, Japan

[73] Assignee: TDK Corporation, Japan

[21] Appl. No.: 09/003,052

[22] Filed: Jan. 5, 1998

[30] Foreign Application Priority Data

Jan. 6, 1997 [JP] Japan .................................. 9-010079

[51] Int. Cl.$^6$ ................................ B05D 3/12; B05C 3/18
[52] U.S. Cl. ............................................ 427/356; 118/410
[58] Field of Search ............................ 427/356; 118/410, 118/429

[56] References Cited

U.S. PATENT DOCUMENTS

| | | | |
|---|---|---|---|
| 2,982,995 | 5/1961 | Groleau | 18/12 |
| 2,999,648 | 9/1961 | Wahlin et al. . | |
| 3,072,346 | 1/1963 | Wahlin et al. . | |
| 3,104,829 | 9/1963 | Wahlin . | |
| 3,146,674 | 9/1964 | Wahlin . | |
| 3,275,248 | 9/1966 | O'Brien et al. . | |
| 4,332,840 | 6/1982 | Tanaka et al. . | |
| 4,828,779 | 5/1989 | Hiraki et al. | 118/410 |
| 4,832,991 | 5/1989 | Hayward et al. | 118/410 |
| 5,320,679 | 6/1994 | Derezinski et al. . | |
| 5,329,964 | 7/1994 | Derezinski . | |
| 5,501,737 | 3/1996 | Takahashi et al. | 118/410 |
| 5,709,750 | 1/1998 | Schiefer | 118/410 |

FOREIGN PATENT DOCUMENTS

| | | |
|---|---|---|
| 61-238362 | 10/1986 | Japan . |
| 62-95174 | 5/1987 | Japan . |
| 1-236968 | 9/1989 | Japan . |

*Primary Examiner*—Katherine A. Bareford
*Attorney, Agent, or Firm*—Lerner, David, Littenberg, Krumholz & Mentlik, LLP

[57] ABSTRACT

A coating method and coating apparatus capable of providing a coated film of improved surface properties free from any streak and color shading and facilitating coating on a sheet of an increased width without causing enlargement of the apparatus and thus complicating its structure. A swirling motion imparting mechanism and an orifice are arranged at a connection between a liquid feed pipe and a coater. Swirling motion is imparted to coating liquid discharged from a pump and then a flow velocity of the coating liquid is immediately increased to a level as high as 200 cm/s or more, the liquid then being fed into a pocket of the coater within 0.1 second or less. This permits shearing to act on the coating liquid, to thereby effectively prevent a variation in viscosity of the coating liquid and flocculation thereof, so that the coated film may be improved in surface properties.

7 Claims, 3 Drawing Sheets

EXTRUSION COATING METHOD AND COATING APPARATUS WITH SWIRL AND THROTTLE MEANS

BACKGROUND OF THE INVENTION

This invention relates to a coating apparatus of the extrusion type adapted to form a film of coating liquid on a flexible sheet material continuously traveling and a coating method using such a coating apparatus, and more particularly to a coating apparatus and a coating method which are suitable for use for manufacturing of a magnetic tape or the like.

A coating apparatus of the extrusion type has been extensively directed to a variety of applications such as manufacturing of a magnetic tape and the like because it is superior in both operability and controlling of a thickness of a coated film to other coating apparatus utilizing roll coating techniques, gravure coating techniques, doctor coating techniques and the like. However, the coating apparatus of the extrusion type causes stagnation of coating liquid to relatively frequently occur in a flow passage through which the coating liquid is fed. Such stagnation of the coating liquid tends to lead to a variation in viscosity of the coating liquid and coagulation or flocculation thereof, resulting in streaks and/or color shading being generated on a film formed of the coating liquid.

A coating apparatus intended to solve such a problem as described above is disclosed in each of Japanese Patent Application Laid-Open Publication No. 236968/1989, Japanese Patent Application Laid-Open Publication No. 238362/1986 and Japanese Patent Application Laid-Open Publication No. 95174/1987. More specifically, the coating apparatus disclosed in Japanese Patent Application Laid-Open Publication No. 236968/1989 is so constructed that a part of coating liquid received in a pocket of a coater is withdrawn out of the pocket at a position thereof farthest from a coating liquid feed position of the pocket in a width direction of a flexible sheet material to be coated with the coating liquid, resulting in stagnation of the coating liquid in the pocket, as well as both a variation in viscosity of the coating liquid and flocculation thereof being prevented.

However, the coating apparatus of the Japanese publication necessarily requires a withdrawal piping system, a withdrawal pump, a filter unit, a flow meter and the like for forcibly withdrawing the coating liquid out of the pocket of the coater, resulting in being complicated in structure. Also, it requires to control, within a predetermined narrow range, a ratio between a rate at which the coating liquid is fed into the pocket and a rate at which it is withdrawn therefrom for coating. Such control is highly troublesome. Also, a failure in such control or deviation of the ratio from the predetermined range causes air to enter the pocket, resulting in a coated film or a film formed of the coating liquid being defective.

The coating apparatus of Japanese Patent Application Laid-Open Publication No. 238362/1986 is constructed so as to prepare a magnetic paint by mixing a paint containing a magnetic powder and a curing agent with each other, guide the magnetic paint to a swirl flow passage to subject it to a swirling treatment, and then apply it onto a non-magnetic support or carrier. Unfortunately, the coating apparatus disclosed tends to cause streaks or color shading to occur on a coated film formed of the coating liquid, to thereby fail to improve surface properties of the coated film.

The coating apparatus of Japanese Patent Application Laid-Open Publication No. 95174/1987 is so constructed that a rotary unit is received in a pocket of a coater to subject coating liquid to shearing, to thereby keep viscosity of the coating liquid in a width direction thereof substantially constant. The coating apparatus requires to arrange a rotary cylinder in the pocket of the coater, leading to large-sizing of the coater and complication in structure thereof. Also, it needs a drive system for driving the rotary cylinder, to thereby cause an increase in manufacturing cost thereof. Further, it causes deflection of the rotary cylinder, so that application of the coating liquid to a sheet material of an increased width is highly difficult.

SUMMARY OF THE INVENTION

The present invention has been made in view of the foregoing disadvantages of the prior art.

Accordingly, it is an object of the present invention to provide a coating apparatus which is capable of forming a coated film free from any failure such as streaks, color shading or the like without causing enlargement of the apparatus and complicating its structure.

It is another object of the present invention to provide a coating method which is capable of forming a coated film free from any failure such as streaks or the like without causing enlargement of the apparatus and complicating its structure.

In accordance with one aspect of the present invention, there is provided a coating method for applying a coating liquid by means of a coating apparatus including a coater of the extrusion type formed therein with a pocket and a slit communicating with the pocket and a coating liquid feed pump connected to the pocket of the coater through a coating liquid feed pipeline to feed the coating liquid into the pocket. The method includes the step of providing a swirl/acceleration means at a connection between the coating liquid feed pipeline and the pocket. The swirl/acceleration means includes a swirling motion imparting mechanism for imparting swirling motion to the coating liquid and a throttling mechanism for constricting flow of the coating liquid immediately after impartation of swirling motion to the coating liquid by the swirling motion imparting mechanism. The method further includes the steps of feeding the swirl/acceleration means with the coating liquid; imparting swirling motion to the coating liquid by the swirling motion imparting mechanism of the swirl/acceleration means; increasing a flow velocity of the coating liquid to a level of 200 cm/s or more by constricting flow of the coating liquid immediately after impartation of swirling motion to the coating liquid by the swirling motion imparting mechanism; and introducing the coating liquid having the increased flow velocity into the pocket of the coater within 0.1 second or less after increasing the flow velocity.

In a preferred embodiment of the present invention, the step of providing the swirl/acceleration means includes the steps of providing a casing member of a cylindrical shape in which the throttling mechanism and a flow passage communicating with the throttling mechanism are formed, the casing member being fixed to a casing of the coater in such a manner that the throttling mechanism communicates with the pocket and the coating liquid feed pipeline is connected to the casing member so as to communicate with the flow passage; and providing a vane unit having a plurality of vanes in the flow passage of the casing member.

In accordance with another aspect of the present invention, a coating apparatus is provided. The coating apparatus includes a coater of the extrusion type having a casing formed therein with a pocket and a slit communicating with the pocket, a coating liquid feed pump connected to the pocket of the coater through a coating liquid feed pipeline to feed coating liquid into the pocket. The coating apparatus further includes a swirl/acceleration means arranged at a connection between the coating liquid feed pipeline and the pocket. The swirl/acceleration means includes a swirling motion imparting mechanism for imparting swirling motion to the coating liquid and a throttling mechanism for constricting flow of the coating liquid immediately after impartation of swirling motion to the coating liquid by the swirling motion imparting mechanism, to thereby increase a flow velocity of the coating liquid to a level of 200 cm/s or more, followed by feeding the coating liquid into the pocket within 0.1 second or less.

In a preferred embodiment of the present invention, the swirl/acceleration means includes a casing member of a cylindrical shape in which the throttling mechanism and a flow passage communicating with the throttling mechanism are formed, wherein the casing member is fixed to the casing of the coater while the throttling mechanism communicate with the pocket. The swirl motion imparting mechanism includes a vane unit provided with a plurality of vanes and disposed in the flow passage. The coating liquid feed pipeline is connected to the casing member so as to communicate with the flow passage.

In a preferred embodiment of the present invention, the throttling mechanism comprises an orifice formed at a downstream side end of the casing member to be opposite to the pocket of the coater.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENT

Now, a coating apparatus according to the present invention will be described hereinafter with reference to the accompanying drawings.

Figure 1:
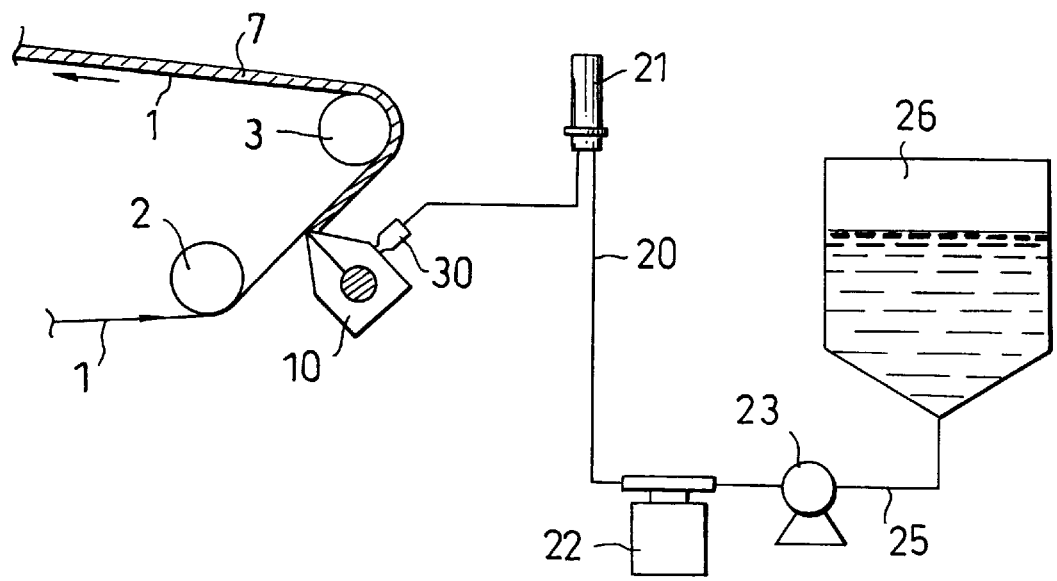
FIG. 1 is a diagrammatic view schematically showing an embodiment of a coating apparatus according to the present invention.

Referring to FIGS. 1 to 7, a coating apparatus of the extrusion type which is an embodiment of a coating apparatus according to the present invention is illustrated. The coating apparatus of the extrusion type, as shown in FIG. 1, generally includes support rollers 2 and 3 between which a sheet material 1 to be coated is stretchedly arranged so as to continuously travel in a direction indicated at an arrow and a coater 10 arranged in proximity to the sheet material 1. The coater 10 has a coating liquid feed pipe 20 connected thereto through a joint 30 acting as a swirl/acceleration means. The coating liquid feed pipe 20 has a filter 21 and a flow meter 22 connected in series thereto and is connected to a constant-quantity or fixed displacement liquid feed pump 23. The feed pump 23 has a discharge port connected to the feed pipe 20 and a suction port connected through a coating liquid suction pipe 25 to a coating liquid storage tank 26. The feed pump 23 acts to discharge a constant amount of coating liquid per unit time. Any suitable pump which has been conventionally known in the art may be used for this purpose. The coating liquid thus discharged from the feed pump 23 is fed through the feed pipe 20 and the like into a pocket 12 defined in the coater 10, which will be described hereinafter with reference to FIG. 2. Reference numeral 7 designates a coated film formed on a surface of the sheet material 1 or a film formed of the coating liquid on a surface of the sheet material 1.

Figure 2:
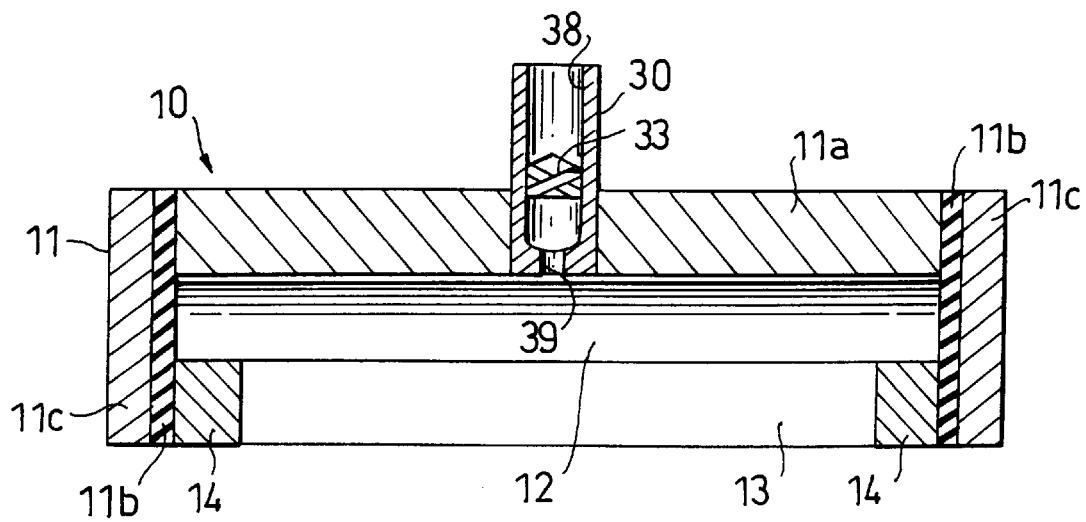
FIG. 2 is a schematic sectional view showing a coater of the coating apparatus shown in FIG. 1.

The coater 10, as shown in FIG. 2, includes a casing 11, which is constituted by a casing body 11a and side plates 11c liquid-tightly joined to the casing body 11a through gaskets 11b in such a manner that the pocket 12 and a slit 13 communicating with the pocket 12 are defined therein. The slit 13 is formed to be open so as to face a portion of the sheet material 1 positioned between the support rollers 2 and 3 and extend over a whole width of the sheet material 1 in a width direction of the sheet material 1 or in a direction perpendicular to a direction in which the sheet material 1 travels. A length of the slit 13 and therefore a width of the film 7 coated on the sheet material 1 is adjusted by coating width regulating plates 14.

Figure 3:
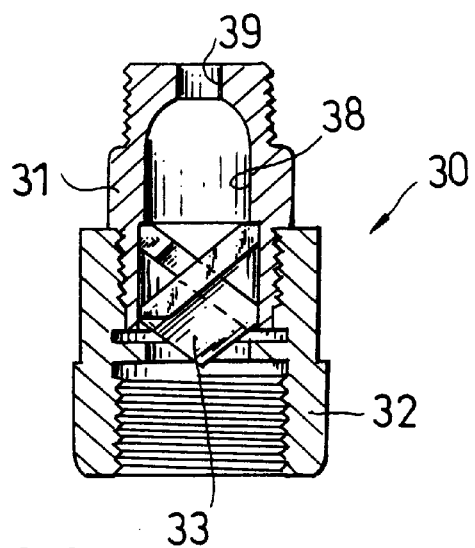
FIG. 3 is a sectional view showing a joint incorporated in the coater shown in FIG. 2.

The joint 30 acting as the swirl/acceleration means is mounted on the casing 11 of the coater 10 while being opposite to the slit 13. The coating liquid feed pipe 20 described above is connected to the joint 30. The joint 30, as shown in FIG. 3, includes a first hollow joint member or first casing member 31 constituting a part of a casing of the joint 30, a second hollow joint member or second casing member 32 constituting the remaining part of the casing and a vane unit 33 arranged in the casing so as to act as a means for imparting swirling motion to the coating liquid. The joint 30 thus constructed functions to impart swirling motion to the coating liquid and then constrict or throttle flow of the coating liquid passing therethrough, to thereby permit a flow velocity of the coating liquid to be increased.

The first joint member 31 is threadedly fixed at one end thereof to the casing 11 of the coater 10 and has a nozzle or orifice 39 formed at the one end so as to act as a throttling mechanism, which is open to the pocket 12 of the coater 10 while being positioned at a central portion of the pocket 12. The second joint member 32 is threadedly fitted at one end thereof on the first joint member 31 and is threadedly fitted at the other end thereof to the coating liquid feed pipe 20. The first and second joint members 31 and 32 thus threadedly joined to each other cooperate together to define a cylindrical flow passage 38 therein, in which the vane unit 33 is received. The nozzle 39 is formed to have suitable dimensions depending on a flow rate of the coating liquid or the like, to thereby increase the flow velocity of the coating liquid to a level of 200 cm/s or more.

Figure 4:
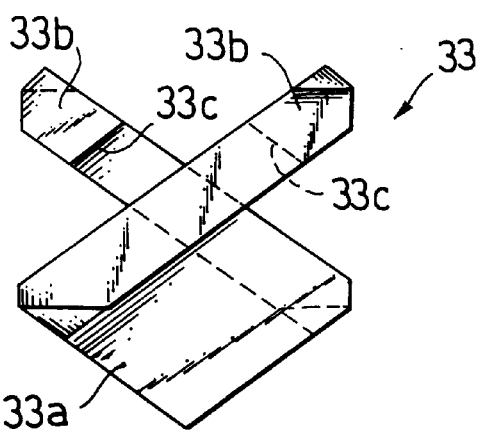
FIG. 4 is a front elevation view showing a vane unit acting as a swirling motion imparting means which is a main component of the joint shown in FIG. 3.
Figure 5:
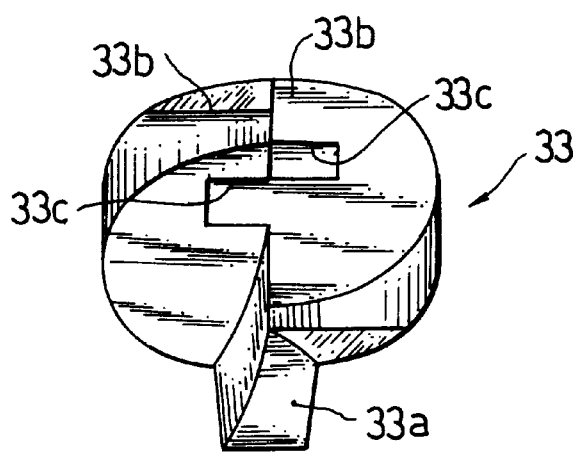
FIG. 5 is a side elevation view of the vane unit shown in FIG. 4.
Figure 6:
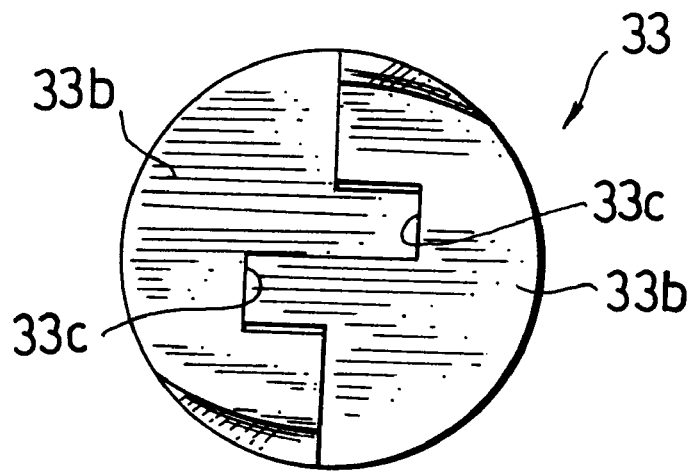
FIG. 6 is a plan view of the vane unit shown in FIG. 4.
Figure 7:
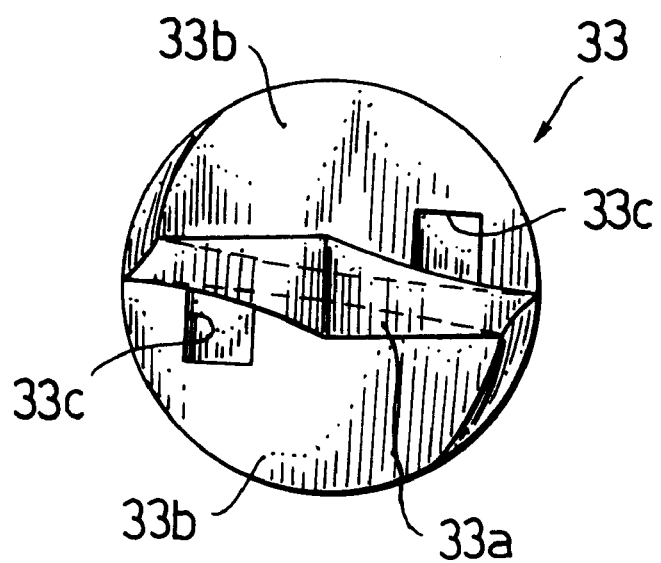
FIG. 7 is a bottom view of the vane unit shown in FIG. 4.

The vane unit 33, as shown in FIGS. 4 to 7, is constituted by a tab 33a and two vanes 33b which are integrally formed with the tab 33a and is arranged in such a manner that the tab 33a is positioned on an upstream side in a direction of flowing of the coating liquid while facing the coating liquid feed pipe 20 and the vanes 33b are positioned on the downstream side while facing the, nozzle 39. The vane unit 33 thus constituted is arranged within the flow passage 38 and held on a shoulder formed on a side surface of the first joint member 31. The tab 33a is constructed into a plate-like member of a substantially diamond shape in front and so as to extend in an axial direction of the flow passage 38 or in the direction of flowing of the coating liquid, as shown in FIG. 4. The vanes 33b are arranged on ends of two sides of the tab 33a positioned on the downstream side in the direction of flowing of the coating liquid in a manner to extend perpendicularly to the tab 33a therefrom, respectively.

The vanes 33b are each formed with a substantially semicircular plate-like shape which has an arcuate outer peripheral edge extending circumferentially about 180 degrees and an linear inner edge like a bowstring. The vanes 33b thus formed are arranged while being oppositely inclined at a predetermined angle with respect to the direction of flowing of the coating liquid. Also, the vanes 33b are each so arranged that one of halves of the inner edge thereof is connected to the side of the tab 33a and the other half is formed with a cutout 33c of a rectangular shape of which one side surface is flush with one surface of the other or remaining vane 33b.

The joint 30 functions to permit the coating liquid supplied from the feed pipe 20 connected to the coater 10 therethrough to be fed into the coater 10 therethrough. The vane unit 33 functions to impart swirling motion to the coating liquid passing the flow passage 38 and the nozzle 39 functions to constrict or throttle flow of the coating liquid. This results in the coating liquid being fed into the coater 10 while being increased in the flow velocity.

The joint 30 is not restricted to such construction as described above. A nozzle disclosed in any one of U.S. Pat. Nos. 2,999,648, 3,072,346, 3,104,829, 3,146,674 and 3,275,248 may be used for the joint 30 by modifying the shape of an outlet thereof. Alternatively, a combination of any suitable orifice or nozzle with a swirl flow passage disclosed in Japanese Patent Application Laid-Open Publication No. 238362/1986 may be used for this purpose.

In the illustrated embodiment constructed as described above, the coating liquid in the coating liquid storage tank 26 is discharged from the tank 26 to the coating liquid feed pipe 20 by the feed pump 23 and then fed from the coating liquid feed pipe 20 through the joint 30 into the pocket 12 of the coater 10. Then, the coater 10 extrudes the coating liquid from the pocket 12 through the slit 13 toward the sheet material 1, so that the coated film 7 of a uniform thickness may be formed on the sheet material 1.

The coating liquid introduced into the joint 30 has swirling motion imparted thereto by the vane unit 33 in the joint 30 before it is fed into the pocket 12 of the coater 10. Then, flow of the coating liquid is constricted by the nozzle 39 immediately after impartation of the swirling motion thereto, resulting in the coating liquid being fed directly into the pocket 12 from the nozzle 39 at a flow velocity as high as 200 cm/s or more and within 0.1 second or less after the flow velocity being thus increased. This permits the coating liquid flowing into the pocket 12 to be subjected to shearing, resulting in both a variation in viscosity of the coating liquid and coagulation or flocculation thereof being effectively prevented, so that the coated film 7 formed on the sheet material 1 may exhibit satisfactory surface properties while being free from any streak and color shading.

As can be seen from the foregoing, the coating method and coating apparatus of the present invention are constructed so as to impart swirling motion to the coating liquid fed from the pump and then immediately increase a flow velocity of the coating liquid to a level as high as 200 cm/s or more, to thereby feed it into the pocket of the coater within 0.1 second or less. Such construction permits shearing to act on the coating liquid, to thereby effectively prevent a variation in viscosity of the coating liquid and flocculation thereof, resulting in the coated film formed on the sheet material being free from any streak and color shading. Also, such construction permits the coated film of such improved surface properties to be obtained by merely arranging the swirling motion imparting mechanism and throttling mechanism at the connection between the coating liquid feed pipe and the coater. Thus, the coating method and coating apparatus of the present invention accomplish coating on a sheet material of an increased width without causing enlargement of the coating apparatus and thus complicating its structure.

EXAMPLES

The present invention will be understood more readily with reference to the following examples while comparing them with comparative examples; however, these examples are intended to illustrate the invention and are not to be construed to limit the scope of the invention.

Example 1

First, magnetic coating liquid having such a composition as shown in Table 1 was prepared.

TABLE 1

| Composition of Magnetic Coating Liquid | |
|---|---|
| Component | Quantity (parts by weight) |
| $\gamma\text{-}Fe_2O_3$ | 100 |
| $Al_2O_3$ | 0.2 |
| $TiO_2$ | 0.1 |
| Erucic acid | 0.8 |
| PHOSPHANOL RE610*[1] | 1.5 |
| Vinyl chloride-vinyl acetate copolymer | 14.9 |
| Polyurethane | 6.4 |
| Methyl ethyl ketone | 86 |
| Methyl isobutyl ketone | 43 |
| Toluene | 43 |
| CORONATE 3041*[2] | 4.2 |

*[1]Organic phosphoric acid compound, manufactured by Toho Chemical Industry Co., Ltd.
*[2]3-TDI molecule adduct of trimethylolpropane, manufactured by Nippon Polyurethane Co., Ltd.

The joint 30 constructed as described above was attached to the coater 10 having such specifications as shown in Table 2 to provide the coating apparatus of the present invention.

TABLE 2

| Coater | |
|---|---|
| Slit gap | 0.17 mm |
| Slit depth | 35 mm |
| Curvature radius of trailing edge | 25 mm |
| Length of trailing edge | 1.5 mm |
| Sectional area of pocket | 5.0 cm$^2$ |

The coating liquid prepared as described above was subjected to imparting swirling motion thereto and constriction of flow by means of the thus-constructed coating apparatus, to thereby be increased in a flow velocity thereof to a level as high as 215 cm/s, resulting in being fed into the pocket 12, so that the coated film 7 was formed under such coating conditions as shown in Table 3.

TABLE 3

| Coating Conditions | |
| --- | --- |
| Coating width | 520 mm |
| Coating speed | 400 m/min |

Subsequently, the coated film 7 was subjected to an orientation treatment and a drying treatment in order, resulting in the coated film 7 of about 4.6 μm being obtained.

Comparative Example 1

The procedure described in Example 1 was substantially repeated except that the coating liquid was fed into the pocket 12 without being subjected to imparting any swirling motion thereto and without being increased in the flow velocity thereof.

Comparative Example 2

The procedure described in Example 1 was substantially repeated except that the coating liquid was increased in an average flow velocity to a level of 211 cm/s through an orifice without being subjected to imparting any swirling motion thereto.

Comparative Example 3

The procedure described in Example 1 was substantially repeated except that the coating liquid was fed into the pocket 12 while being subjected to imparting swirling motion thereto and without being increased in the flow velocity.

Examples 2 and 3 and Comparative Examples 4 and 5

In each of the examples and comparative examples, the coating liquid was subjected to imparting swirling motion thereto and increased in the flow velocity. Then, the coating liquid was fed into the pocket 12 at an average flow velocity of 215 cm/s in Example 2 and 315 cm/s in Example 3, 95 cm/s in Comparative Example 4 and 143 cm/s in Comparative Example 5.

Examples 4 and 5 and Comparative Example 6

The coating liquid was subjected to imparting swirling motion thereto and then increased in the flow velocity, resulting in being fed into the pocket 12 at an average velocity of 378 cm/s, so that a length of time required between passage of the coating liquid through the orifice (nozzle) 39 and flowing of the liquid into the pocket 12 was adjusted to be 0.079 second in Example 4 and 0 in Example 5 and 0.26 second in Comparative Example 6.

Then, the coated film 7 obtained in each of the examples and comparative examples was subjected to both measurement of surface roughness and visual inspection of surface streak. The surface roughness was measured using a surface roughness measuring equipment of the Tarry-step tracer type manufactured by Rank Taylor Hobson.

Results of the measurement and inspection in each of Comparative Examples 1 to 3 and Example 1, those in Comparative Examples 4 and 5 and Examples 2 and 3, and those in Examples 4 and 5 and Comparative Example 6 were as shown in Tables 4, 5 and 6, respectively.

TABLE 4

| | Comparative Example 1 | Comparative Example 2 | Comparative Example 3 | Example 1 |
| --- | --- | --- | --- | --- |
| Liquid feed manner | Ordinary Straight Pipe | Straight pipe + orifice | Swirl-like spiral pipe | Cylindrical passage with vane unit + orifice |
| | [—] | [Only acceleration] | [Only swirl] | [Swirl + acceleration] |
| Number of times of swirling [Stages of swirl vane units] | None [—] | None [—] | 10 [—] | ½ (=180°) [One stage] |
| Average flow velocity* (cm/s) | 15 | 211 | 22 | 215 |
| Surface roughness of coated film (Ra nm) | 47.2 | 48.5 | 50.2 | 39.4 |
| Surface state of coated film (streaks like lauan grain) | Observed over whole coated film | ← | ← | Substantially none |

*Average flow velocity indicates an average flow velocity of the coating liquid at which the coating liquid is fed into the pocket.

TABLE 5

| | Comparative Example 4 | Comparative Example 5 | Example 2 | Example 3 |
| --- | --- | --- | --- | --- |
| Number of times of swirling [Stages of swirl vane units] | ½ (=180°) [One stage] | ← | ← | ← |
| Average flow* velocity (cm/s) | 95 | 143 | 215 | 315 |
| Surface roughness of coated film (Ra nm) | 50.9 | 43.8 | 39.4 | 37.9 |
| Surface state of coated film (streaks like lauan grain) | Observed over whole coated film | Observed on both sides | Substantially none | None |

*Average flow velocity indicates an average flow velocity of the coating liquid at which the coating liquid is fed into the pocket.

TABLE 6

| | Example 4 | Example 5 | Comparative Example 6 |
| --- | --- | --- | --- |
| Time*[1] (s) | 0 | 0.079 | 0.26 |
| Number of times of swirling [Stages of swirl vane Units] | ½ (=180°) [One stage] | ← | ← |
| Average flow velocity*[2] (cm/s) | 378 | ← | ← |

TABLE 6-continued

|  | Example 4 | Example 5 | Comparative Example 6 |
|---|---|---|---|
| Surface state of coated film (streaks like lauan grain) | None | None | Observed over whole coated film |

*[1]Time indicates a length of time required between passage of the coating liquid through the orifice (nozzle) and flowing of the liquid into the pocket.
*[2]Average flow velocity indicates an average flow velocity of the coating liquid at which the coating liquid is fed into the pocket.

As will be noted from Table 4, the coated film which was obtained in Example 1 according to the present invention exhibited satisfactory surface conditions or properties, whereas the coated film obtained in each of Comparative Examples 1 to 3 failed to exhibit improved surface properties.

Also, Table 5 indicates that Examples 2 and 3 each provided the coated film 7 improved in surface properties, whereas Comparative Example 4 failed to improve surface properties of the coated film. Also, the coated film obtained in Comparative Example 5 was deteriorated in surface properties on both sides thereof.

Further, Table 6 indicates that Examples 4 and 5 each provided the coated film 7 improved in surface properties, whereas the coated film obtained in Comparative Example 6 was not improved in surface properties.

While a preferred embodiment of the present invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method for applying a coating liquid by means of an extrusion coater, said extrusion coater including a pocket and a slit communicating with said pocket, said method comprising feeding said coating liquid towards said pocket in said extrusion coater, imparting a swirling motion to said coating liquid immediately prior to entry of said coating liquid into said pocket, increasing the flow velocity of said coating liquid having said swirling motion to a level of at least about 200 cm/s by constricting said flow of said coating liquid having said swirling motion, introducing said coating liquid having said increased flow velocity into said pocket within about 0.1 seconds after said increase of said flow velocity, and passing said coating liquid from said pocket through said slit for application to a substrate.

2. The method of claim 1 wherein said imparting of said swirling motion comprises providing a vane unit having a plurality of vanes in said flow of said coating liquid.

3. Coating apparatus comprising an extrusion coater having a pocket and a slit communicating with said pocket for applying a coating liquid to a substrate, a coating liquid feedline for feeding said coating liquid to said pocket, a coating liquid feed pump for feeding said coating liquid through said coating liquid feedline, swirl means for imparting a swirling motion to said coating liquid, said swirl means being disposed at a connection between said coating liquid feed line and said pocket, throttle means for constricting said flow of said coating liquid immediately downstream of said swirl means, thereby increasing said flow of said coating liquid to at least about 200 cm/s, said throttle means being disposed in proximity to said pocket whereby said coating liquid is fed into said pocket from said throttle means within about 0.1 seconds.

4. The coating apparatus of claim 3 wherein said swirl means includes a casing having a cylindrical shape, said throttle means being disposed in said casing.

5. The coating apparatus of claim 4 wherein said casing is fixed to said extrusion coater.

6. The coating apparatus of claim 4 wherein said casing includes a casing flow passage, and wherein said swirl means comprises a vane unit including a plurality of vanes, said vane unit being disposed in said casing flow passage, and said coating liquid feedline being connected to said casing.

7. The coating apparatus of claim 4 wherein said throttle means comprises an orifice formed at the downstream end of said casing proximate to said pocket.

* * * * *